(12) United States Patent
Giorgio

(10) Patent No.: US 10,948,298 B2
(45) Date of Patent: Mar. 16, 2021

(54) INERTIAL UNIT WITH SUSPENDED INERTIAL DEVICE

(71) Applicant: SAFRAN ELECTRONICS & DEFENSE, Boulogne-Billancourt (FR)

(72) Inventor: Alain Giorgio, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 16/771,183

(22) PCT Filed: Dec. 6, 2018

(86) PCT No.: PCT/EP2018/083848
§ 371 (c)(1),
(2) Date: Jun. 9, 2020

(87) PCT Pub. No.: WO2019/115359
PCT Pub. Date: Jun. 20, 2019

(65) Prior Publication Data
US 2020/0300632 A1    Sep. 24, 2020

(30) Foreign Application Priority Data
Dec. 12, 2017 (FR) ..................... 17 62016

(51) Int. Cl.
*G01C 21/16* (2006.01)
*F16F 1/38* (2006.01)
(Continued)

(52) U.S. Cl.
CPC ............. *G01C 21/16* (2013.01); *F16F 1/38* (2013.01); *F16F 15/08* (2013.01); *F16M 13/02* (2013.01); *G01C 19/00* (2013.01); *G01P 15/0802* (2013.01)

(58) Field of Classification Search
CPC .. G01C 21/16; F16F 15/08; F16F 1/38; G01P 1/023; G01P 15/0802; F16M 13/02
See application file for complete search history.

(56) References Cited

U.S. PATENT DOCUMENTS 2,919,882 A * 1/1960 Barkalow ............... F16F 3/093
248/573
5,348,267 A * 9/1994 Lanting ................... F16F 15/08
248/635

(Continued)

FOREIGN PATENT DOCUMENTS

| EP | 2000697 A2 | 12/2008 |
|---|---|---|
| FR | 3039641 A1 | 2/2017 |

*Primary Examiner* — Helen C Kwok
(74) *Attorney, Agent, or Firm* — Muncy, Geissler, Olds & Lowe, P.C.

(57) ABSTRACT

Equipment including an inertial detector device provided with fastener studs enabling the inertial device to be fastened to a support frame. At least one of the fastener studs has two elements, one of which elements is fastened to the support frame and has a bearing surface that is in contact with a bearing surface of the support frame. The other element is fastened to the inertial device and has a bearing surface that is in contact with a bearing surface of the inertial device, which two elements are suspended relative to each other by means of a body made of elastically deformable material. At least one of the elements is fastened by at least one screw. The corresponding bearing surfaces is provided respectively with a centering portion and with a housing for receiving said centering portion with a fit that allows clearance of no more than 50 μm.

13 Claims, 2 Drawing Sheets

(51) Int. Cl.
*F16F 15/08* (2006.01)
*F16M 13/02* (2006.01)
*G01C 19/00* (2013.01)
*G01P 15/08* (2006.01)

(56) References Cited

U.S. PATENT DOCUMENTS

| | | | | |
|---|---|---|---|---|
| 5,360,236 A | * | 11/1994 | Brown | G01C 21/16 |
| | | | | 248/310 |
| 5,366,200 A | * | 11/1994 | Scura | F16F 7/00 |
| | | | | 248/632 |
| 5,927,680 A | * | 7/1999 | Bridges | G01C 19/16 |
| | | | | 248/581 |
| 6,371,073 B1 | * | 4/2002 | Billimack | F02F 7/006 |
| | | | | 123/195 C |
| 2004/0150144 A1 | | 8/2004 | Goepfert et al. | |
| 2008/0302621 A1 | * | 12/2008 | Damien | F16F 15/08 |
| | | | | 188/379 |

* cited by examiner

INERTIAL UNIT WITH SUSPENDED INERTIAL DEVICE

STATE OF THE ART

Inertial equipment is known that comprises an inertial device, such as an inertial sensor or an inertial unit, that is provided with fastener tabs enabling the inertial device to be fastened to a support frame fitted on or secured to the vehicle that is to be equipped with the inertial unit, which fastening may optionally be via an interface plate.

Each fastener tab comprises a shoe defining a bore in which there is suspended an insert connected to the shoe by a body made of elastically deformable material.

The shoe possesses a sole for pressing against the support frame and means for anchoring it to the support frame.

The insert is tubular in shape, having a first end face for bearing against the inertial device. The insert defines a duct that receives a screw having a threaded segment that projects from the first end face in order to be engaged in a tapped hole in the inertial device.

The body made of elastically deformable material is annular in shape, with an outer edge secured to the wall of the bore in the shoe and an inner edge secured to an outside surface of the insert.

When the shoe of the fastener tab is fastened to the frame and the insert is fastened to the inertial device, the insert does not touch the frame and the structure does not touch the shoe. Thus, nothing impedes relative movements between the structure and the shoe, which movements are made possible by the body of elastically deformable material. The body of elastically deformable material can thus damp any transmission to the inertial device of movements and impacts to which the frame might be subjected. Such movements or impacts can degrade the performance of the inertial device, temporarily or even in the long term.

In spite of that, inertial devices do not always provide the expected performance under certain mechanical stresses.

OBJECT OF THE INVENTION

An object of the invention is to provide means for improving the performance of inertial devices.

BRIEF SUMMARY OF THE INVENTION

To this end, the invention provides equipment comprising an inertial detector device provided with fastener studs enabling the inertial device to be fastened to a support frame. At least one of the fastener studs comprises two elements, one of which elements is fastened to the support frame and has a bearing surface that is in contact with a bearing surface of the support frame, and the other of which elements is fastened to the inertial device and has a bearing surface that is in contact with a bearing surface of the inertial device, which two elements are suspended relative to each other by means of a body made of elastically deformable material. At least one of the elements is fastened by at least one screw, and the corresponding bearing surfaces are provided respectively with a centering portion and with a housing for receiving said centering portion with a fit that allows clearance of no more than 50 micrometers ($\mu m$).

In prior art devices, it has been found that the insert moves relative to the inertial device under the effect of impacts, vibration, or sudden movements. This movement gives rise to mechanical stresses that can degrade the performance of the inertial device, even when they are very small. The centering portion prevents any such sliding, or in any event limits such sliding.

Other characteristics and advantages of the invention appear on reading the following description of particular, nonlimiting embodiments of the invention.

BRIEF DESCRIPTION OF THE FIGURES

Reference is made to the accompanying drawings, in which.

DETAILED DESCRIPTION OF THE INVENTION

Figure 1:
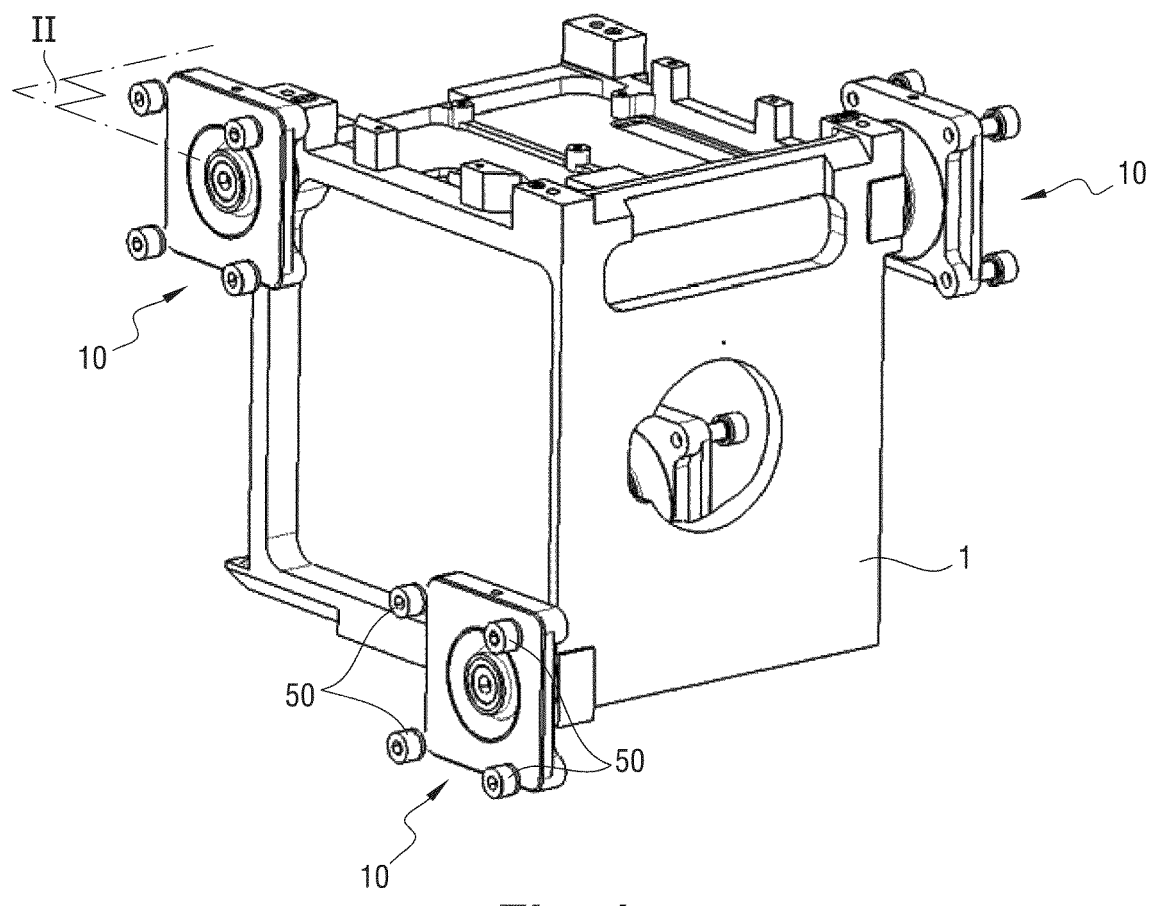
FIG. 1 is a perspective view of an inertial device of the invention.
Figure 2:
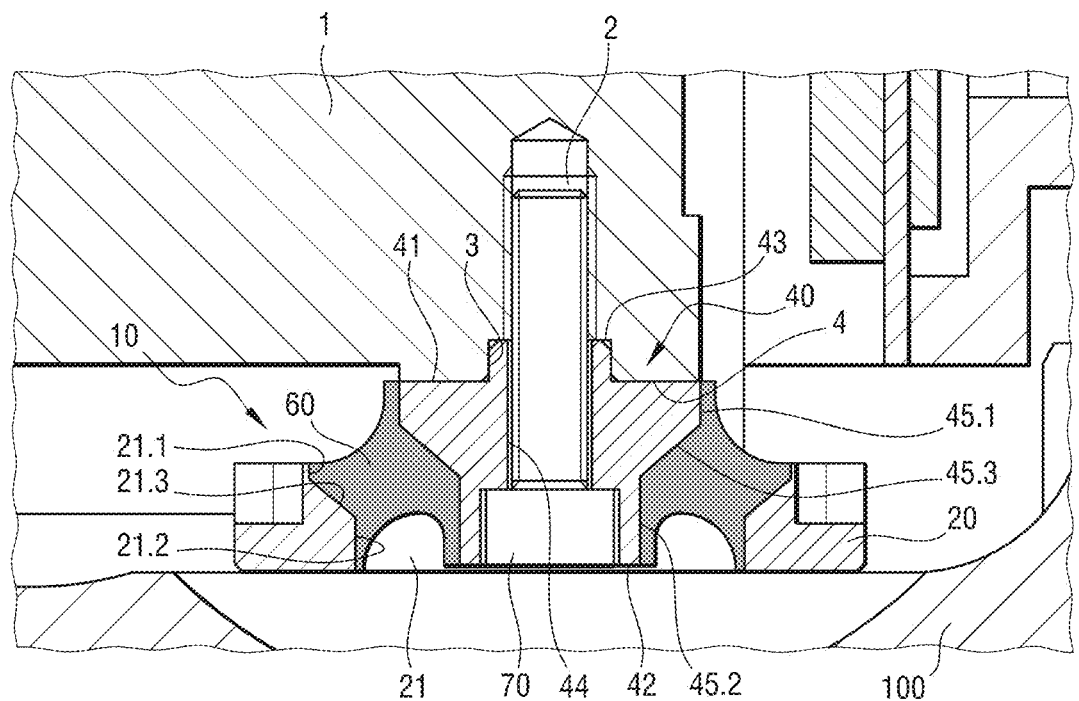
FIG. 2 is a fragmentary view of the inertial device in section on plane II of FIG. 1.

With reference to the figures, the inertial equipment of the invention comprises an inertial core (not visible in figures) that is mounted in a structure that is substantially in the shape of a cube. The structure and the inertial core form an inertial device 1.

The inertial core is itself known and comprises linear inertial sensors and angular inertial sensors arranged on the axes of a measurement reference frame. The linear inertial sensors are accelerometers, e.g. pendulous accelerometers. The angular sensors are gyros, which may be rate gyros or free gyros. The inertial core also includes a processor unit for processing the signals that come from the inertial sensors.

The structure of the inertial device 1 has fastener tabs 10 enabling the inertial device 1 to be fastened to a support frame 100.

Each fastener tab 10 comprises a first element formed of a shoe 20 defining a bore 21 in which there is suspended a second element formed of an insert, given overall reference 40, that is connected to the shoe 20 by a body 60 made of elastically deformable material.

The bore 21 has a first end facing towards the structure of the inertial device 1, and a second end facing in the opposite direction, and it also possesses a central axis that is substantially perpendicular to a sole via which the shoe 20 bears against the support frame 100. The bore 21 has a first cylindrical segment of 21.1 of larger diameter beside the first end, a second cylindrical segment 21.2 of smaller diameter beside the second end, and a frustoconical segment 21.3 interconnecting the cylindrical segments of 21.1 and 21.2. The shoe 20 has means for anchoring it to the support frame 100, specifically in the form of holes for passing fastener screws 50 that are engaged in tapped holes in the support frame 100 or in the form of tapped holes that receive screws passing through holes provided in the support frame 100.

The insert 40 is axisymmetric in shape, with a first end face 41 for bearing against a surface 4 of the structure of the inertial device 1, and at its opposite end, a second end face 42. The insert 40 includes a centering portion 43 projecting from the center of the first end face 41 and defining a central duct 44 that opens out firstly in the center of the centering portion 43 and secondly in the center of the second end face 42. In this example, the duct 44 is stepped, comprising a main segment opening out in the center of the centering portion 43 and an inlet counterbore opening out in the center of the second end face 42. The main segment is for receiving the body of a screw 70 having a head that is received in the inlet counterbore in such a manner that the body has a threaded end segment projecting from the centering portion 43. The threaded end segment that projects from the centering portion 43 is engaged in a tapped hole 2 that opens out via an inlet counterbore 3 to the surface 4 of the structure of the inertial device 1, and the head of the screw 70 is accessible from the second end face 42 of the insert 40. The centering portion 43 is received as a sliding fit in the inlet counterbore 3 of the tapped hole 2 in order to center the insert 40 relative to the structure of the inertial device 1 sufficiently accurately to prevent any relative movement between the insert 40 and the structure of the inertial device 1 giving rise to mechanical stresses that could degrade the performance of the inertial device 1. In this example, the sliding fit is preferably of the H7g6 type. The centering portion 43 does not touch the end of the inlet counterbore 3 and is of a length that is short enough to provide centering that is "short" ("centerage court" in French).

The insert 40 has a total length that is longer than the length of the shoe 20 (lengths measured parallel to the central axes of the bore 21 and of the duct 44).

The outside surface of the insert 40 is axisymmetric, having a first cylindrical segment 45.1 of larger diameter beside the first end face 41, a second cylindrical segment 45.2 of smaller diameter beside the second end face 42, and a frustoconical segment 45.3 connecting together the cylindrical segments 45.1 and 45.2.

The terminal segment 21.2 faces the cylindrical segment 45.2, the frustoconical segment 21.3 faces the frustoconical segment 45.3, and the terminal segment 21.1 faces the frustoconical segment 45.3. The first cylindrical segment 45.1 and the adjacent portion of the frustoconical segment 45.3 extend beyond the first end of the bore 21, projecting from the shoe 40. The cylindrical segments of 21.1 and 21.2 are of diameters that are much greater (by several millimeters) than the diameters of the cylindrical segments 45.1 and 45.2.

The frustoconical segment 21.3 thus faces towards the structure of the inertial device 1 and has the same angle as the frustoconical segment 45.3, which faces towards the frustoconical segment 21.3 of the bore 21.

In this example, the body 60 is made of elastomer material and it is arranged to urge the insert 40 resiliently both laterally into a position that is coaxial relative to the bore 21, and also longitudinally into a position in which it projects from the shoe 20 towards the structure of the inertial device 1. For this purpose, the body 60 is annular in shape, having an outside surface that matches and completely covers the surface of the bore 21, and an inside surface that matches and completely covers the outside surface of the insert 40. The body 60, which is made as a single piece, thus has: both a first annular portion that extends between the frustoconical segment 45.3 and the frustoconical segment 21.3 together with the first cylindrical segment 21.1; and also a second annular portion that extends between the second cylindrical segments 45.2 and 21.2. The second annular portion has a concave end surface with its concave side facing in the same direction as the second end face 42. In this example, the concave end surface presents a plane groove of cross-section that is substantially U-shaped.

Preferably, the body 60 is overmolded onto the shoe 20 and the insert 40 so that its outside surface is adhesively bonded to the wall of the bore 21 in the shoe 20 and its inside surface is adhesively bonded to the outside surface of the insert 40.

Figure 3:
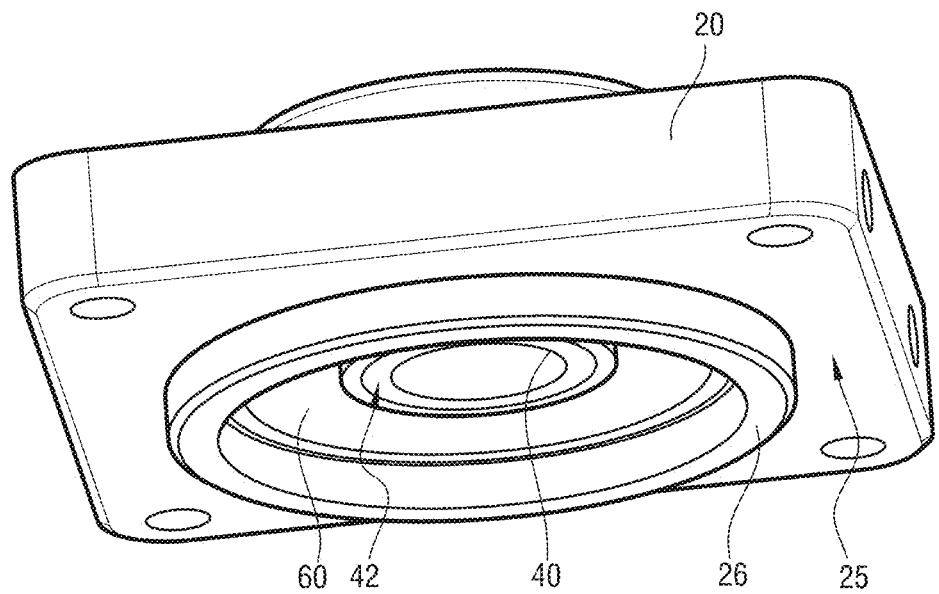
FIG. 3 is a perspective view of a fastener stud in a variant embodiment.

In a variant, as shown in FIG. 3, the centering portion and the housing are arranged level with the contact between the bearing surfaces of the support frame 100 and of the shoe 20.

More precisely, the shoe 20 has a bearing surface 25 bearing against the support frame 100. A centering portion 26, in the form of an annular rim, projects from the bearing surface 25, coaxially with the bore 21.

The support frame 100 then has a setback arranged in its bearing surface in contact with the bearing surface 25 in order to receive the centering portion 26. By way of example, the setback may be in the form of a bore that receives the centering portion 25 with clearance of no more than 50 μm.

In a variant, the centering portion 26 may project from the bearing surface of the support frame 100, and the housing for receiving said centering portion may be arranged in a shoe 20.

The centering portion 26 of the support frame may be received in the housing in the shoe as a tight fit or as a sliding fit up to a fit leaving clearance of 50 μm.

Naturally, the invention is not limited to the embodiments described and covers any variant coming within the ambit of the invention as defined by the claims.

In particular, the insert could be of some other shape, and in particular it could have some other outside shape, and the bore may be of some other shape.

The body 60 could be of a shape other than that described, and for example it need not cover completely the wall of the bore and/or the outside surface of the insert.

The body 60 may be made up of a plurality of parts, e.g. a plurality of separate angular segments.

The screws may be screwed into the shoe and/or into the insert.

The diameter of the first cylindrical segment 45.1 may be less than the diameter of the second cylindrical segment 21.2.

The centering portion may be formed by the first cylindrical segment 45.1.

The centering portion 43 may project from the bearing surface of the inertial device 1, and the housing for receiving said centering portion may be arranged in the insert 40.

The centering portion 43 may be received in the housing 3 as a tight fit or as a sliding fit up to a fit leaving clearance of 50 μm.

The centering portion 43 may be off-axis relative to the duct 44.

The invention claimed is:

1. An equipment comprising an inertial detector device provided with fastener studs enabling the inertial device to be fastened to a support frame, at least one of the fastener studs comprising two elements, one of the elements is fastened to the support frame and has a bearing surface that is in contact with a bearing surface of the support frame, and the other of the elements is fastened to the inertial device and has a bearing surface that is in contact with a bearing surface of the inertial device, the two elements being suspended relative to each other by a body made of elastically deformable material, at least one of the elements being fastened by at least one screw, and the corresponding bearing surfaces being provided respectively with a centering portion and with a housing for receiving said centering portion with a fit that allows clearance of no more than 50 μm.

2. The equipment according to claim 1, wherein one of the elements is a shoe having means for anchoring the shoe to the support frame and defining a bore, and the other of the elements is an insert held suspended in the bore by the body of elastically deformable material, the insert having a first end face that forms the bearing surface in contact with the bearing surface of the inertial device and defining a duct receiving a screw having a threaded segment that projects from the first end face so as to be engaged in a tapped hole in the inertial device.

3. The equipment according to claim 2, wherein the centering portion projects from the first end face.

4. The equipment according to claim 2, wherein the centering portion is coaxial with the duct.

5. The equipment according to claim 2, wherein the shoe possesses a sole for bearing against the support frame.

6. The equipment according to any claim 2, wherein the bore includes a frustoconical segment facing towards the inertial device, and the insert includes a segment of frustoconical outside surface facing towards the frustoconical segment of the bore, an annular portion of the body made of elastically deformable material extending between the frustoconical segment of the bore and the segment of frustoconical outside surface of the insert.

7. The equipment according to claim 6, wherein the insert includes, beside a second end face, a segment of cylindrical outside surface facing a cylindrical segment of the bore, the body made of elastically deformable material including, between the segment of cylindrical outside surface of the insert and the cylindrical segment of the bore, a concave annular portion with a concave side facing in the same direction as the second end face.

8. The equipment according to claim 7, wherein the insert includes, beside the first end face, a segment of cylindrical outside surface projecting from the shoe.

9. The equipment according to claim 2, wherein the body made of elastically deformable material has an annular shape with an outside surface secured to the bore in the shoe, and an inside surface secured to an outside surface of the insert.

10. The equipment according to claim 2, wherein the centering portion projects from the bearing surface of the inertial device and the housing is formed in the insert.

11. The equipment according to claim 1, wherein the centering portion and the housing are arranged level with the contact between the bearing surfaces of the support frame and of the corresponding element.

12. The equipment according to claim 1, wherein the fit is an H7g6 sliding fit.

13. The equipment according to claim 1, wherein the centering portion is arranged to provide centering that is short.

* * * * *